Dec. 6, 1955 D. P. RODDIN ET AL 2,726,168

ELECTROSENSITIVE RECORDING AND DUPLICATING BLANK

Filed July 11, 1951

INVENTORS
D. P. RODDIN
B. L. KLINE

BY

ATTORNEY 2,726,168
Patented Dec. 6, 1955

2,726,168

ELECTROSENSITIVE RECORDING AND DUPLICATING BLANK

Daniel P. Roddin, Howard Beach, and Bernard L. Kline, Manhasset, N. Y., assignors to The Western Union Telegraph Company, New York, N. Y., a corporation of New York Application July 11, 1951, Serial No. 236,192

5 Claims. (Cl. 117—36)

This invention relates generally to an electrosensitive recording blank on which various kinds of subject matter may be recorded by means of telegraph facsimile or other types of electrical signals which are applied to selected elemental areas of the blank by means of an electrical stylus that scans the recording surface of the blank, and particularly to such a blank which is adapted to produce a master record from which a large number of copies may be made by hectographic or other duplicating processes.

Facsimile communication methods are now commonly employed for the transmission and reproduction in facsimile of telegrams, press dispatches, pictures, maps, drawings and other subject matter. Such methods utilize a transmitting blank which is scanned either by optical or electrical pickup means, depending upon the character of the transmitting blank, for generating the facsimile signals. Reception of the messages commonly is effected on dry electrosensitive recording blanks by a color change in, or removal of, a high-resistance or insulating surface coating in elemental areas thereof in response to marking currents applied thereto.

One of the objects of the instant invention is to provide a novel dry electrosensitive recording blank.

Other objects are to provide such a blank which is particularly adapted for use as a duplicating blank that enables duplicate copies of the subject matter recorded thereon to be produced by hectographic or other duplicating processes; to embody a comparatively large amount of transferable dye in the duplicating blank in such manner that substantially all of it remains available for duplicating purposes; to enable the desired subject matter to be recorded on the duplicating blank, by removal of an electrosensitive masking coating in elemental surface areas thereof, with a sufficiently low value of power in the recording stylus circuit as to prevent any substantial removal or loss of the dye during the recording operation, whereby a large number of duplicate copies of the subject matter may be obtained; to produce fine definition in the subject matter thus recorded and also in the large number of duplicate copies obtainable therefrom; and to cause the subject matter on the duplicate copies to exhibit high tinctorial strength.

Figure 1:
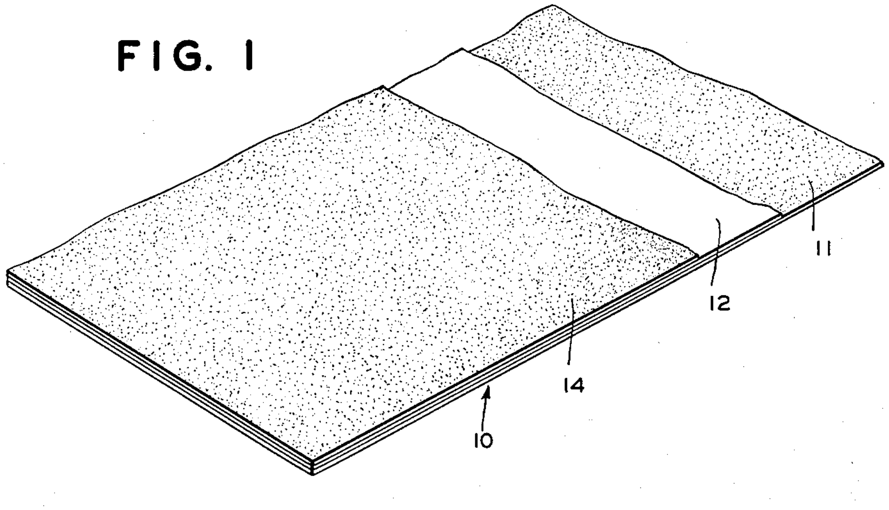
Figure 2:
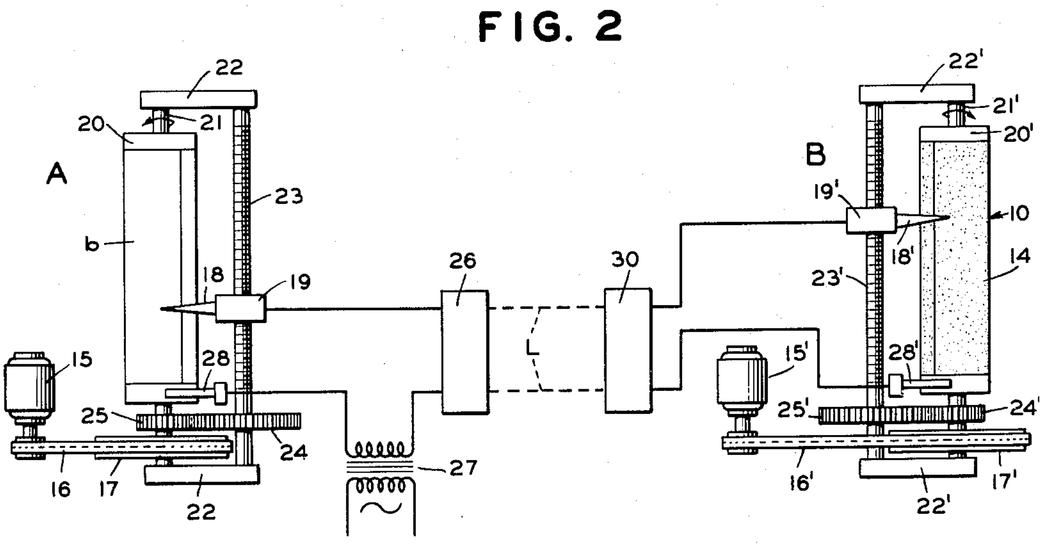

Other objects and advantages will appear from the following detailed description of a preferred embodiment of the invention, taken in connection with the accompanying drawings, in which:

Fig. 1 is a perspective view of one form of a recording and duplicating blank embodying the invention; and Fig. 2 illustrates diagrammatically a facsimile transmitting and receiving system in which a recording and duplicating blank in accordance with the invention is adapted to be used.

A recording and duplicating blank 10 embodying the invention in its simplest form is shown in Fig. 1. The composite blank embodies a base sheet 11 preferably, although not necessarily, of fibrous material, which may be ordinary paper. Calendered paper is preferred since it enables a smoother surface coating of electrosensitive material to be obtained and over which a recording stylus can travel without contact bounce or variation in contact resistance. The sheet 11 is made conductive by having finely divided conducting particles, such as carbon black or metallic particles, uniformly distributed throughout the pulp from which the paper sheet is rolled, so that signal marking current in the stylus circuit can flow through the sheet to an underlying metal platen, such as the cylinder of a facsimile recording machine on which the blank 10 is placed during a recording operation. The thickness of the paper, when used for the base sheet 11, may vary from .0015 inch for tissue to .003 inch for thicker stock which comprises ordinary Manila paper. The conductivity of the sheet 11 must be sufficiently high to cause the recording stylus current readily to pass through the sheet. For example, a suitable degree of conductivity of a carbon impregnated sheet is such that if a metal plate is positioned under the sheet and an electrode whose area of contact surface is .5 sq. cm. is pressed on the upper surface of the sheet with a pressure of approximately 500 grams, the electrical resistance of the paper is of the order of from 18 ohms to 50 ohms, it being understood that the conductivity will vary to some extent depending upon the kind of paper and the thickness thereof. It will also be appreciated that the conductivity of the sheet may vary within considerable limits and yet produce suitable marking effects, depending upon various other factors such as the voltage and current values in the recording stylus circuit, the speed at which the recorder is to operate, and the frequency of the marking current in the stylus circuit when alternating current is employed.

When the blank is to be used both for recording and duplicating purposes, the sheet 11 has its upper conductive surface, as viewed in Fig. 1, coated with a layer 12 which is a dispersion of an undissolved water-soluble dye in a binder solution that has no solvent action on the dye. Various known dyes may be employed, depending upon the color and tinctorial strength desired, such as methyl violet. A suitable binder solution, for example, is ethyl cellulose or ester gum dissolved in a volatile hydrocarbon or a halogenated hydrocarbon. If methyl violet is employed as the dye, the applied coating 12 when dried consists of dye and binder in the ratio of approximately 10 to 2 by weight, and in the case of methyl violet has the characteristic green color of dry dye powder. The binder is used in an amount sufficient to bind the dye layer, but not in such amount as would prevent the dye layer from having a grainy and porous character for the reason hereinafter stated. The use of the dry undissolved dye prevents its absorption by the underlying paper sheet 11 and thus provides a comparatively large amount of dye in the blank in such manner that substantially all of it remains available for duplicating purposes.

On top of the dye coating is applied a film 14 of finely divided carbon, such as carbon black, which is dispersed in a binder that is a nonsolvent for the dye. The same kind of binder may be used as in the case of the dye coating, that is, the carbon black may be dispersed in ethyl cellulose or ester gum solutions in a volatile hydrocarbon or halogenated hydrocarbon. When dry, this carbon film is well bonded to the dye coating and masks it completely. The amount of carbon relative to its binder must be such as to provide high electrical conductivity, in order to effect removal of the carbon coating in elemental surface areas thereof when subjected to electrical marking currents of a value to expose the underlying layer of dye in these elemental areas without effecting removal of the dye. When the binder above mentioned is employed, a suitable ratio of carbon to the binder is approximately 5 to 2. If the resistance of the masking electrosensitive coating 14 were high, as by the use of too much binder relative to the carbon content, the value of voltage and current necessary to effect breakdown of the coating would also effect removal of the dye or a considerable portion thereof, and thus only a few duplicate copies could be made from the remaining dye. The dye comprising the layer 12 is in itself a dielectric, but since it is in the dry state in the blank and has a grainy or porous character, particles of the carbon of which the surface coating 14 is composed will penetrate the minute interstices in the dye layer and thus provide a good conductive path through the layer of dye to the underlying conductive sheet 11, and thus the conductivity through the recording and duplicating blank is substantially the same as that through the base sheet 11.

In practice, a dye coating having a thickness of approximately .0003 inch provides a sufficient available supply of dye for most purposes and the top carbon coating 14 may have a thickness of the order of .0001 inch. When the blank has had the desired subject matter recorded thereon, the recording is placed face down on a hectograph mat or bed, causing the dye to transfer in highly concentrated form to the gelatin, and copies are made from this in the usual manner. Due to the quantity and concentration of the dye in the master blank, from 50 to 100 legible copies can be made immediately with sharp and fine definition. This desirable result is due to the method of handling the dye so that no solution of it takes place at any stage of manufacture of the blank, and no other material is used with the dye except the minimum amount of required binder. Since the dye particles are bound and covered with a waterproof gum or resin, they are protected from atmospheric humidity and the paper does not deteriorate in storage.

Fig. 2 illutsrates how the recording and duplicating blank may be used in a conventional facsimile system. The figure diagrammatically illustrates a facsimile transmitter A and a facsimile recorder B. The transmitter A may comprise either optical or electrical pickup devices, both of which are well known in the facsimile art; for simplicity, an electrical pickup device is shown. The transmitter comprises a rotatable metallic cylinder or platen 20 carried by a centrally disposed driving shaft 21 which is journalled in frame members 22. During transmission of signals, the cylinder is rotated, in the direction indicated by the arrow, by any suitable means such as an electric motor 15, preferably of the alternating current synchronous type, which is connected in the illustrative form shown by a driving pulley and belt 16 to a driven pulley 17 keyed to the shaft 21. Transmission may be effected in any suitable manner, for example, as described in B. L. Kline Patent No. 2,229,091, issued January 21, 1941, in which the transmitting blank *b* has conductive characters on a nonconductive background, or as described in a copending application of B. L. Kline, Serial No. 5,568, filed January 31, 1948, now Patent No. 2,572,871, issued October 30, 1951, in which the transmitting blank *b* has nonconductive characters on a conductive background. In such arrangements a scanning electrode or stylus 18, whose point bears on the surface of the blank *b* bearing the characters comprising the message, is supported by a traveling carriage 19 adapted for movement longitudinally along a rotatable shaft 23 screw-threaded throughout the greater part of its length, the shaft being rotated by driving gears 24 and 25 keyed to the shafts 23 and 21, respectively. Thus, the stylus 18 is caused to traverse the cylinder in a longitudinal direction as the cylinder 20 rotates, the pitch of the thread of the shaft 23 determining the number of scanning lines per inch. In this manner the stylus point will describe a helical path as it moves over the surface of the transmitting blank *b* and thus produces a scanning action.

The transmitting blank is wrapped once around the metallic cylinder 20 in the manner shown in the figure and may be releasably secured to the cylinder in any desired manner, as by elastic retaining bands such as shown in Wise et al. Patent No. 2,255,868, issued September 16, 1941. The foregoing method of obtaining a scanning movement per se is well known, as are various methods of electrically or optically scanning a given field for producing facsimile signals, and it is to be understood that any of the known methods of producing signals by means of optical or electrical scanning devices suitable for the purpose may be employed.

Connected to the transmitter is auxiliary transmitting apparatus 26 which includes one or more amplifier stages and, if desired, signal inverter means to effect picture reversal so as to transmit a positive copy of the subject matter on blank *b*. If desired, the transmitted signals may have a carrier frequency component introduced by the transformer 27 which is connected in circuit with a brush 28 that engages an end of the drum 20.

Transmitting apparatus 26 is interconnected by a circuit L to receiving apparatus 30 by means of which the received signals are applied to the recorder B. The construction of the recorder B may be identical to that of transmitter A. A metallic cylinder 20′, which carries an electrosensitive recording and duplicating blank 10 made in accordance with the instant invention, is canned by an electrical recording stylus 18′ when signals are received from transmitter A. Synchronism of the moving parts of transmitter A and recorder B are properly maintained in any of the various ways known in the art, and the message or image upon the original transmitting blank *b* will be reproduced in facsimile upon the electrosensitive surface 14 of the recording and duplicating blank 10. It will be understood that the transmitting and receiving devices A and B may be located at considerable distances from each other or they may be located at the same place for local operation.

Instead of employing a facsimile recorder for producing the desired subject matter on the recording and duplicating blank 10, the subject matter may be applied by means of an electrical stylus held in the hand of an operator or other person, in which case the blank 10 is placed on a flat metal platen to complete the recording circuit. Any kind of subject matter, such as writing, pictures, and the like, may be produced by this handwritten method, and duplicate copies of the recorded subject matter made in the manner herein described.

Recording may be effected on the blank of the instant invention either by means of direct current marking signals or by alternating current marking signals. When using direct current for marking, it appears to make little difference whether the polarity of the recording stylus is positive or negative. The potential of the direct current signals may be of the order of 100 volts, and the current flowing through the blank ordinarily is of the order of 44 milliamperes. When alternating current is used for the marking signals, a frequency of the order of 2500 cycles per second is satisfactory, and the marking potentials and currents are of the same order as those given above for direct current. Recording is effected with very little spark and very little smoke, and the fumes from the smoke are non-toxic.

In the embodiment shown in Fig. 1, the base sheet 11 is impregnated throughout with finely divided metal particles or carbon in order to render the sheet conductive throughout, but if desired a nonconductive sheet 11 may be employed provided its upper surface has a continuous adhesive coating of metal particles or carbon in a suitable binder, thereby to provide a good conductive layer on the surface of the nonconductive paper. In this case, the recording may be effected by condenser action, since the conductive layer on the surface of the sheet 11 and the underlying metallic platen or cylinder 21′ provide electrodes of considerable area separated by the dielectric paper 11, and displacement currents are caused to flow through the recording and duplicating blank when alternating currents of sufficiently high frequency are caused to flow in the stylus circuit. Also, the conductive coating on sheet 11 may be caused to extend beyond the marginal portions of the layers 12 and 14 a sufficient distance to make contact with the brush 28', so that the recording circuit is completed by a path extending laterally through the coating on sheet 11, in which case recording may be effected with direct current signals applied to the stylus. In general, however, it will be found that uniform results are more easily obtained when the sheet 11 is impregnated with carbon in the manner of the embodiment illustrated in Fig. 1, since the resistance of the lateral path through the coating is much higher than that of a path directly through the impregnated sheet to an underlying platen.

Any color dye may, of course, be used depending upon the requirement or preference of the user, although in any case the adhesive binder should be a nonsolvent for the dye. By the successive use of several blanks respectively containing different colored dyes, and each blank representing its proper portion of the subject matter as a result of filtered transmission, a gelatin master may be made from which copies of colored pictures can be reproduced in multiple copy.

The sheet 11 preferably is composed of paper, but it will be obvious that various other materials in sheet form may be used so long as they either are inherently conductive; as in the case of a metal foil, or may be impregnated with carbon or other conducting particles or may be coated with the conducting particles in an amount to provide a layer of good conductivity embodied in the composite blank. For brevity, the expression "electrically conductive sheet" is employed in certain of the claims in a generic sense, wherever applicable, to define a sheet which either is inherently conductive or which is impregnated with a conductive substance or is coated with a conductive substance, and which is suitable for the purposes of the invention.

Other and varied forms of the composite recording and duplicating blank will present themselves to those versed in the art without departing from the invention, and the invention is therefore not limited except by the scope of the appended claims.

What is claimed is:

1. A composite electrosensitive recording and duplicating blank comprising an electrically conductive sheet, said sheet having a conductive surface thereof covered with an adhesive layer of a dry water-soluble dye dispersed in a binder which is a nonsolvent for the dye, said layer of dye being masked with an adhesive electrosensitive surface coating of finely divided carbon uniformly dispersed in a binder that is soluble in a volatile non-aqueous liquid and which in the solution is a nonsolvent for the dye, said carbon being present in the binder in an amount to provide sufficiently high electrical conductivity to effect removal of the carbon coating in elemental surface areas thereof when subjected to electrical marking currents of a value to expose the underlying layer of dye in said elemental areas without effecting removal of the dye.

2. A composite electrosensitive recording and duplicating blank comprising an electrically conductive sheet, said sheet having a conductive surface thereof covered with an adhesive layer of a dry water-soluble dye dispersed in a binder which is a nonsolvent for the dye, said layer of dye being masked with an adhesive electrosensitive surface coating of finely divided carbon uniformly dispersed in a binder that is soluble in a liquid of the class consisting of volatile hydrocarbons and halogenated hydrocarbons and which in the solution is a nonsolvent for said dye, said carbon being present in the binder in an amount to provide sufficiently high electrical conductivity to effect removal of the carbon coating in elemental surface areas thereof when subjected to electrical marking currents of a value to expose the underlying layer of dye in said elemental areas without effecting removal of the dye.

3. A composite electrosensitive recording and duplicating blank comprising a sheet impregnated with finely divided carbon, said sheet having a surface thereof covered with an adhesive layer of a dry water-soluble dye dispersed in a binder which is a nonsolvent for the dye, said layer of dye being masked with an adhesive electrosensitive surface coating of finely divided carbon uniformly dispersed in a binder that is soluble in a liquid of the class consisting of volatile hydrocarbons and halogenated hydrocarbons and which in the solution is a nonsolvent for the dye, said carbon being present in said impregnated sheet and in said last named binder in an amount to provide sufficiently high electrical conductivity to effect removal of said electrosensitive carbon coating in elemental surface areas thereof when subjected to electrical marking currents of a value to expose the underlying layer of dye in said elemental areas without effecting removal of the dye.

4. A composite electrosensitive recording and duplicating blank comprising a sheet having an adhesive surface coating of finely divided carbon, said sheet having the carbon-coated surface thereof covered with an adhesive layer of a dry water-soluble dye dispersed in a binder which is a nonsolvent for the dye, said layer of dye being masked with an adhesive electrosensitive surface coating of finely divided carbon uniformly dispersed in a binder that is soluble in a liquid of the class consisting of volatile hydrocarbons and halogenated hydrocarbons and which in the solution is a nonsolvent for the dye, said carbon being present in said adhesive surface coating of the sheet and in said last named binder in an amount to provide sufficiently high electrical conductivity to effect removal of said electrosensitive carbon coating in elemental surface areas thereof when subjected to electrical marking currents of a value to expose the underlying layer of dye in said elemental areas without effecting removal of the dye.

5. A composite electrosensitive recording and duplicating blank comprising an electrically conductive sheet, said sheet having a conductive surface thereof covered with an adhesive nonconductive layer of a dry water-soluble dye dispersed in a binder which is a nonsolvent for the dye, said layer of dye being masked with an adhesive electrosensitive surface coating of finely divided carbon uniformly dispersed in a binder with particles of said carbon penetrating minute interstices in the dye layer and in electrical contact with said conductive sheet, said binder being soluble in a volatile non-aqueous liquid and which in the solution is a nonsolvent for the dye, said carbon being present in the binder in an amount to provide sufficiently high electrical conductivity to effect electrical breakdown and removal of the carbon coating in elemental surface areas thereof when subjected to electrical marking currents of a value to expose the underlying layer of dye in said elemental areas without effecting removal of the dye.

References Cited in the file of this patent

UNITED STATES PATENTS

| | | |
|---|---|---|
| 2,398,779 | Dalton et al. | Apr. 23, 1946 |
| 2,440,364 | Champion | Apr. 27, 1948 |
| 2,500,617 | Meigs | Mar. 14, 1950 |